*L. Williams.*

*Egg Beater.*

N°. 98,633.            Patented Jan. 4, 1870.

WITNESSES:
R. T. Spurry
J. W. Phps

INVENTOR:
Lewis Williams

United States Patent Office.

LEWIS WILLIAMS, OF TERRYSVILLE, CONNECTICUT.

Letters Patent No. 98,533, dated January 4, 1870.

IMPROVED EGG-BEATER.

The Schedule referred to in these Letters Patent and making part of the same.

To all whom it may concern:

Be it known that I, LEWIS WILLIAMS, of Terrysville, county of Litchfield, and State of Connecticut, have invented certain new and useful Improvements in Egg-Beaters, and applicable for cutting, beating, mixing, and the like purposes; and to enable others skilled in the art to make and use the same, I will proceed to describe its construction, referring to the drawings, in which the same letters indicate like parts in each of the figures.

The nature of this invention will be understood from the specification and drawings, the object of which is to simplify its construction, and at the same time render it more efficient for use.

In the accompanying drawings—

Figure 1:
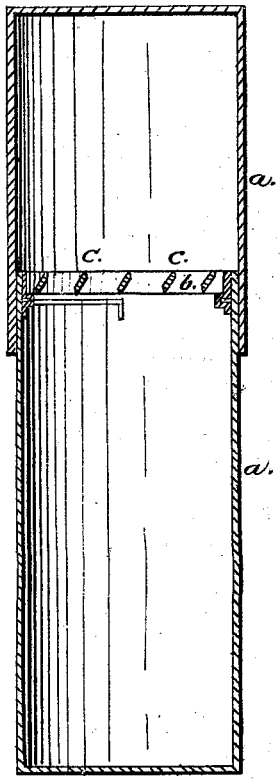
Figure 1 is a lateral-section view.
Figure 2:
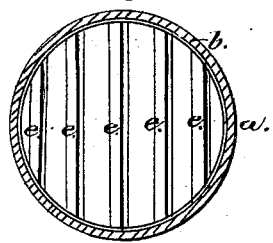
Figure 2 is a cross-section through the cutters or beaters.

A is a receptacle, made in two parts, in the common way, having a cutter, beater, and splasher, composed of a ring, $b$, made of the proper diameter to closely fill the inside diameter of the receptacle, and having arranged therein, and at suitable distance, and in an inclined position with a centre line of the receptacle, cutters, beaters, or splashers $c$.

This device is secured within the body of the receptacle by means of lugs at or near the open end of one part of the receptacle, or it may be placed at any other desired point therein. By the use of this utensil, an egg or any other material susceptible of being beaten up by a like device, may be cut, beaten, and splashed, so that the whole shall become assimilated to a fluid, or to a thoroughly-reduced or mixed condition.

The egg or other material is first placed within one portion of the receptacle, and then the two parts are closed together, and the whole subjected to a shaking-operation for a proper length of time—less time than is usually required with those devices, as now or heretofore in use—when the whole will become thoroughly prepared for use. Then, by removing one part of the receptacle and the beater, its contents can be quickly removed, and the receptacle easily cleaned, ready for further use.

I believe I have thus shown the nature, construction, and advantage of this invention, so as to enable others skilled in the art to make and use the same therefrom.

I claim, as an improvement in the manufacture of egg-beaters, a two-part receptacle, $a$, having a ring, $b$, to closely fill the inside of the receptacle, near their union, and having arranged therein cutters, beaters, or splashers $c$, in an inclined position, having a locking-device to allow it to be easily inserted and removed, as and for the purpose set forth.

LEWIS WILLIAMS.

Witnesses:
R. T. SPERRY,
J. W. BLISS.